United States Patent [19]

Burnham

[11] Patent Number: 5,140,354
[45] Date of Patent: Aug. 18, 1992

[54] LIGHT AND DUST SEAL FOR CAMERA

[75] Inventor: William L. Burnham, Leroy, N.Y.

[73] Assignee: Eastman Kodak Company, Rochester, N.Y.

[21] Appl. No.: 714,295

[22] Filed: Jun. 12, 1991

[51] Int. Cl.⁵ ............................................. G03B 17/02
[52] U.S. Cl. ................................... 354/203; 354/288
[58] Field of Search ............... 354/203, 288, 277, 202

[56] References Cited

U.S. PATENT DOCUMENTS

| | | | |
|---|---|---|---|
| 1,537,539 | 5/1925 | Lucas . | |
| 3,282,181 | 11/1966 | Lange | 95/11 |
| 4,384,780 | 5/1983 | Bresson | 354/288 |
| 4,469,423 | 9/1984 | Bresson | 354/288 |
| 4,641,936 | 2/1987 | Harvey | 354/212 |
| 4,766,451 | 8/1988 | Fujimura et al. | 354/202 |
| 4,812,866 | 3/1989 | Ushiro et al. | 354/288 |

Primary Examiner—W. B. Perkey
Assistant Examiner—Cassandra C. Spyron
Attorney, Agent, or Firm—Roger A. Fields

[57] ABSTRACT

A camera has a rear door which is opened to reveal a cartridge receiving chamber, a pair of substantially parallel film rails located adjacent opposite sides of an exposure opening to support successive lengths of a filmstrip over the exposure opening, and a film take-up chamber. A rigid film pressure plate is connected to the inside of the door to rest against the rails over the exposure opening when the door is closed, to support successive lengths of the filmstrip flat at the exposure opening. According to the invention, a single-piece of resilient compressible opaque material is secured to the inside of the door to form a unitary deformable surface for sealing the cartridge receiving chamber, the exposure opening, and the film take-up chamber against ambient light and dust and urging the pressure plate against the film rails when the door is closed.

2 Claims, 2 Drawing Sheets

LIGHT AND DUST SEAL FOR CAMERA

BACKGROUND OF THE INVENTION

1. Field of the Invention

The invention relates generally to the field of photographic cameras and particularly to an improved camera having an interior light and dust seal.

2. Description of the Prior Art

It is well known for 35 mm still-picture cameras to have a rear door which is opened to reveal a cartridge receiving chamber, a pair of substantially Parallel film rails located adjacent opposite sides of an exposure opening to support successive lengths of a filmstrip over the exposure opening, and a film take-up chamber. Typically, a rigid film pressure plate is mounted on the inside of the door to rest against the rails over the exposure opening when the door is closed, to support successive lengths of the filmstrip flat at the exposure opening. The door and the camera body often include respective edges that overlap when the door is closed, to seal the cartridge receiving chamber, the exposure opening, and the film take-up chamber against ambient light and dust.

SUMMARY OF THE INVENTION

According to the invention, there is provided an improved photographic camera wherein (a) a rear door is opened to reveal a cartridge receiving chamber, a pair of substantially parallel film rails located adjacent respective opposite sides of an exposure opening to support successive lengths of a filmstrip over the exposure opening, and a film take-up chamber, and (b) a rigid film pressure plate is connected to the inside of the rear door to rest against the rails over the exposure opening when the door is closed, and wherein the improvement comprises:

Single-piece resilient compressible opaque means secured to the inside of the rear door to form a unitary deformable surface for sealing the cartridge receiving chamber, the exposure opening, and the film take-up chamber against ambient light and dust and urging the rigid pressure plate against the film rails when the door is closed.

Preferably, the rear door and the single-piece means include respective aligned windows located to view film related information on a film cartridge in the cartridge receiving chamber when the door is closed.

DETAILED DESCRIPTION OF THE PREFERRED EMBODIMENT

The invention is disclosed as being embodied preferably in a 35 mm still-picture camera. Because such a photographic camera is generally well known, this description is directed in particular to camera elements forming part of or cooperating directly with the invention. It is to be understood, however, that camera elements not specifically shown or described may take various forms known to persons of ordinary skill in the art.

Figure 1:
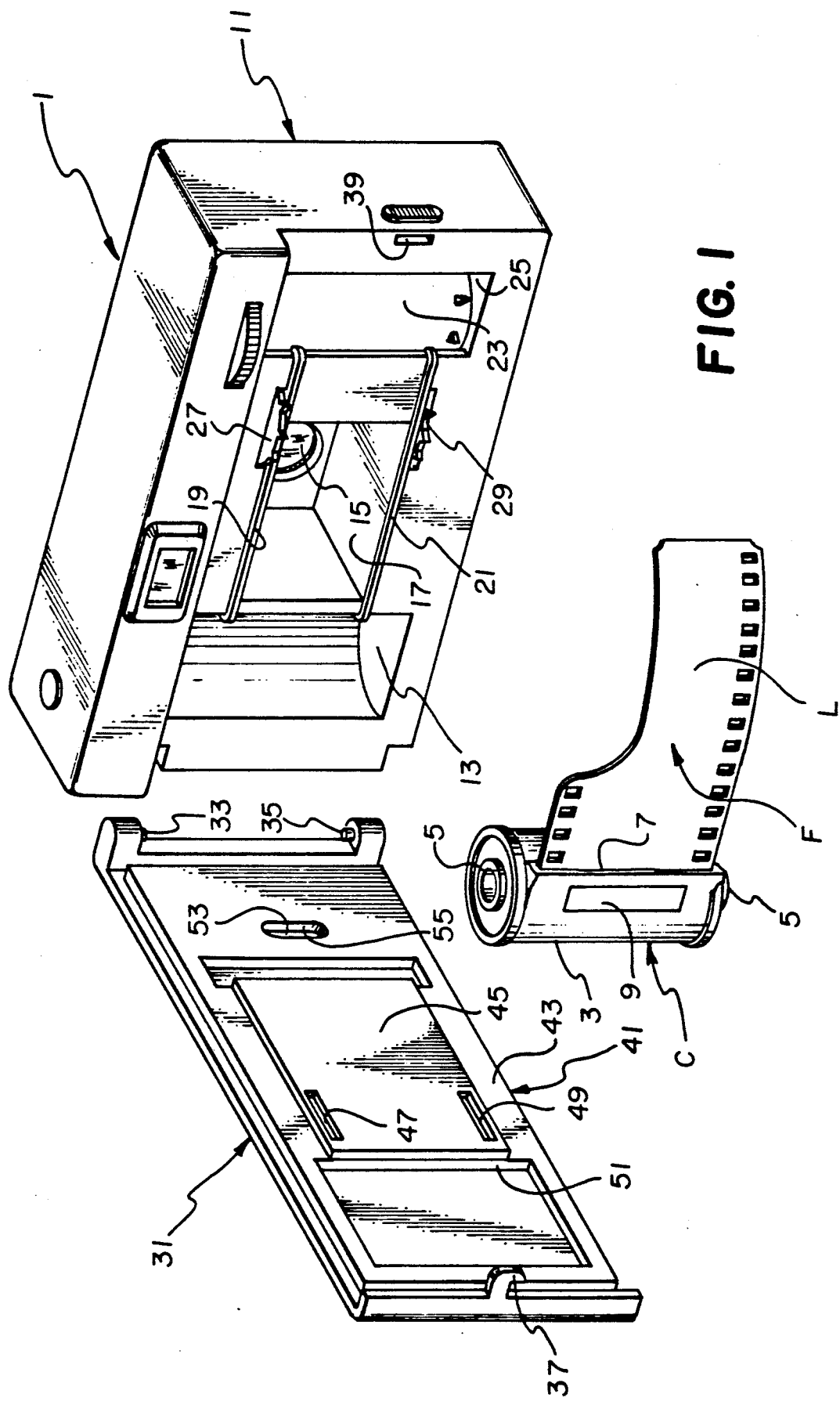
FIG. 1 is a perspective view of a photographic camera having a light and dust seal according to a preferred embodiment of the invention.

Referring now to the drawings, and in particular to FIG. 1, a 35 mm still-picture camera 1 is shown for use with a known type film cartridge C, such as manufactured by Eastman Kodak Company. The film cartridge C comprises a light-tight film container 3 housing a rotatably supported spool 5 on which is wound an edge-perforated 35 mm filmstrip F. A film leader portion L of the filmstrip F longitudinally protrudes from a plush-lined, light-trapped slit 7 in a throat portion of the container 3. The film leader L protrudes a Predetermined length, e.g. 2⅞ in., from the slit 7 and originally is curled about the container 3. A film related information area 9 is imprinted on the container 3, which may include the film type, the ISO and DIN numbers, etc.

The 35 mm camera 1 as shown in FIG. 1 comprises a camera body 11 in which is provided a number of known elements, such as a cartridge receiving chamber 13, a picture-taking lens 15 located within an exposure opening 17, a pair of substantially parallel film rails 19 and 21 located adjacent opposite sides of the exposure opening to support successive lengths of the filmstrip F over the exposure opening, a film take-up drum 23 rotatably supported within a film take-up chamber 25, and a pair of film metering sprockets 27 and 29 protruding from respective holes in the two film rails. A rear door 31 is pivotally coupled with the camera body 11 by means of coaxial pins 33 and 35 proximate the cartridge receiving chamber 11. The door 31 includes an integral locking hook or the like 37 which is received in a locking hole 39 in the camera body 11 when the door is closed.

Figure 2:
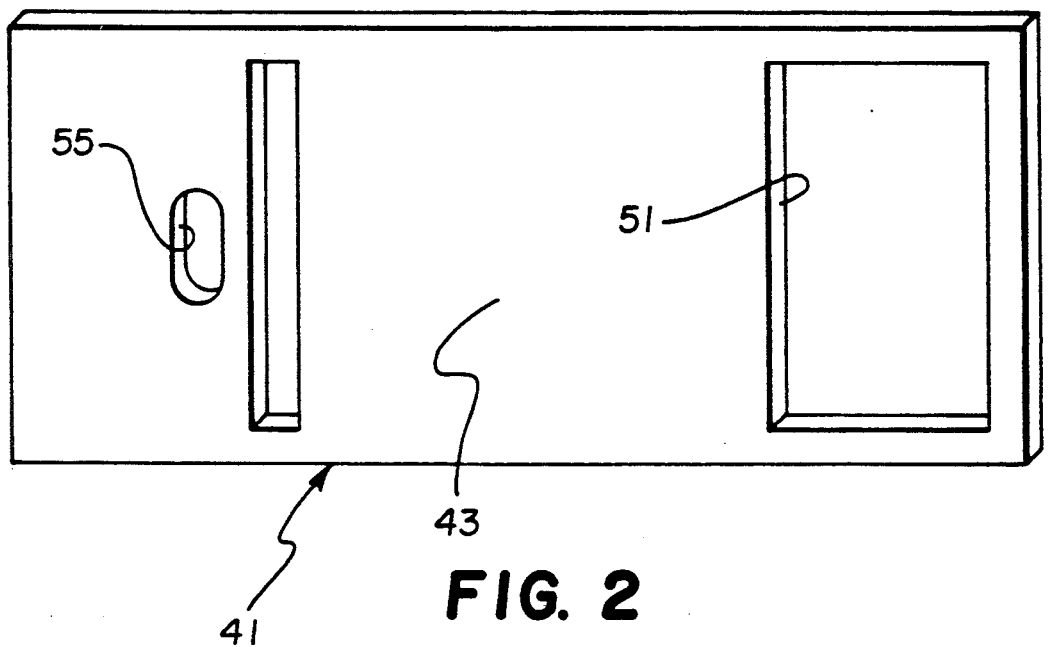
FIG. 2 is a perspective view of the light and dust shield.

According to the invention, a single-piece resilient compressible opaque pad 41 constructed of foam rubber, for example, is secured to the inside of the rear door 31 to substantially overlay the door. See FIGS. 1 and 2. The pad 41 has a unitary deformable outer surface 43 for sealing the cartridge receiving chamber 13, the exposure opening 17, and the take-up chamber 25 against ambient light and dust, especially along the perimeter of the pad, when the door 31 is closed. A rigid pressure plate 45 having respective cavities 47 and 49 for receiving the two metering sprockets 27 and 29 is affixed to the outer surface 43 of the pad 41. This causes the pressure plate 45 to be urged or biased, due to the resilient compressible nature of the pad 43, against the film rails 19 and 21 when the door 41 is closed, to support successive lengths of the filmstrip F flat at the exposure opening 17.

The pad 43 includes a rectangular opening or cut-out 51 which is located opposite the take-up chamber 25 when the rear door 31 is closed. The door 31 and the pad 43 include respectively aligned windows 53 and 55 located for viewing the film related information area 9 on the container 3 of the film cartridge C when the cartridge is in the chamber 13 and the door is closed. In this instance, the pad 41 serves to hold the cartridge C in the chamber 13, particularly since it completely covers the chamber except for the window 55.

The invention has been described in detail with reference to a preferred embodiment. However, it will be appreciated that variations and modifications can be effected within the spirit and scope of the invention.

I claim:

1. An improved photographic camera wherein (a) a rear door can be opened to reveal a cartridge receiving chamber, a pair of substantially parallel film rails located adjacent respective opposite sides of an exposure opening separate from said cartridge receiving chamber for supporting successive lengths of a filmstrip over said exposure opening, and a film take-up chamber separate from the cartridge receiving chamber and the exposure opening, and (b) a rigid film pressure plate connected to the inside of said rear door rests against said rails over said exposure opening, when the door is closed, for supporting successive lengths of the filmstrip flat at the exposure opening, and wherein the improvement comprises:

single-piece, resilient, compressible, opaque means secured to the inside of said rear door to form a unitary deformable surface for sealing all three of said cartridge receiving chamber, said exposure opening, and said film take-up chamber against ambient light and dust when the door is closed and also for urging said rigid pressure plate against said film rails when the door is closed.

2. The improvement as recited in claim 1 wherein said single-piece means is dimensioned to cover said cartridge receiving chamber when said rear door is closed.

* * * * *